United States Patent
De Boer et al.

(10) Patent No.: US 11,982,851 B2
(45) Date of Patent: May 14, 2024

(54) ALIGNMENT AND READOUT OF OPTICAL CHIPS

(71) Applicant: Delta Diagnostics B.V., Rotterdam (NL)

(72) Inventors: Bart Michiel De Boer, Rotterdam (NL); Peter Johan Harmsma, Vleuten (NL)

(73) Assignee: Delta Diagnostics B.V., Rotterdam (NL)

( * ) Notice: Subject to any disclaimer, the term of this patent is extended or adjusted under 35 U.S.C. 154(b) by 290 days.

(21) Appl. No.: 17/616,725

(22) PCT Filed: Jun. 5, 2020

(86) PCT No.: PCT/NL2020/050365
§ 371 (c)(1),
(2) Date: Dec. 6, 2021

(87) PCT Pub. No.: WO2020/246887
PCT Pub. Date: Dec. 10, 2020

(65) Prior Publication Data
US 2022/0299718 A1 Sep. 22, 2022

(30) Foreign Application Priority Data
Jun. 7, 2019 (NL) ...................................... 2023275

(51) Int. Cl.
*G02B 6/42* (2006.01)
(52) U.S. Cl.
CPC ......... *G02B 6/4227* (2013.01); *G02B 6/4222* (2013.01)

(58) Field of Classification Search
CPC .... G02B 6/4227; G02B 6/4222; G02B 6/422; G02B 6/4221; G02B 6/4225; G01N 21/25
See application file for complete search history.

(56) References Cited

U.S. PATENT DOCUMENTS

| 2008/0204760 A1* | 8/2008 | Gollier ............... G01N 21/7703 356/484 |
| 2017/0115206 A1 | 4/2017 | De Boer et al. |
| 2018/0202937 A1 | 7/2018 | Gunn, III et al. |

FOREIGN PATENT DOCUMENTS

EP 3165903 A1 5/2017

OTHER PUBLICATIONS

Sep. 17, 2020 (WO) International Search Report PCT/NL2020/050365.

* cited by examiner

*Primary Examiner* — John Bedtelyon
(74) *Attorney, Agent, or Firm* — Banner & Witcoff, Ltd.

(57) ABSTRACT

In a method or system for interrogating an optical chip (50), the optical chip (50) is illuminated with input light (30) and a spatially resolved image (50*i*) of the output light (31,32) is measured from the optical chip (50). The output light (31,32) is imaged together with a reflection of the input light (30). For example, this can be used to establish, improve, or maintain alignment of the input light (30) on a sensor input port (51) of the optical chip (50). The same detector (17) measures the spatially resolved image and a spectral response of the optical chip (50).

18 Claims, 8 Drawing Sheets

ALIGNMENT AND READOUT OF OPTICAL CHIPS

RELATED APPLICATIONS

This application is a National Stage Application under 35 U.S.C. 371 of co-pending PCT application PCT/NL2020/050365 designating the United States and filed Jun. 5, 2020; which claims the benefit of NL application number 2023275 and filed Jun. 7, 2019, each of which are hereby incorporated by reference in their entireties.

TECHNICAL FIELD AND BACKGROUND

The present disclosure relates to methods and systems for interrogating of an optical chip, e.g. free-space coupling, alignment, and readout.

Kazmierczak et al [Optical Engineering 48(1), 014401, 2009] describes light coupling and distribution for Si3N4/SiO2 integrated multichannel single-mode sensing system. In general, two approaches to the light injection are analyzed: end-fire coupling via the photonics chip facet and surface coupling via a grating. In the case of the analyzed multichannel optical sensor chip discussed in the prior art, the use of a 1-D surface grating input coupler was found to be the most convenient. However for the multiple output couplings it is difficult to use this type of device as they occupy a significant chip area. Accordingly, the prior art solves the problems by out-coupling the optical signal horizontally via the end facet of the photonic chip.

De Vos et al. [IEEE photonics journal, vol. 1, number 4, 2009] describes multiplexed antibody detection with an array of silicon-on-insulator microring resonators. In the optical chip described, three input waveguides are simultaneously addressed through vertical grating couplers (shown to be on one side of the chip) with a 2-mm-wide collimated beam from a tunable laser source. The output signals of the ring resonators are near-vertically coupled to free space by means of integrated grating couplers (shown to be on another side of the chip) and are imaged with an infrared camera. Software captures an image for every wavelength step and stores the maximum intensity values within each dedicated area that overlaps with an output grating coupler spot. According to an illustration of the chip layout top view shown in the first figure of the prior art, the output grating couplers span an area of 750 μm across, while the input grating couplers appear much closer together. So while the imaging setup reportedly allows for high alignment tolerances, much of the 2-mm-wide collimated laser beam overlapping the much smaller input structure may be wasted.

There is a need for further improvement of efficiency and alignment in free-space interrogation of optical chips.

SUMMARY

Some aspects of the present disclosure may be embodied as methods for interrogating an optical chip by illuminating the chip with input light and measuring a spatially resolved image of the corresponding output light. Other or further aspect may be embodied as to a corresponding system for interrogating the optical chip, e.g. using a respective chip holder, light source, detector and imaging system. As described herein it is preferable that the output light is imaged together with a reflection of the input light spot. For example, a surface (e.g. edge or face) of the optical chip is placed in an object plane of an imaging system, e.g. parallel and coinciding with the object plane. The imaging system is configured to project an image of the surface onto a detector disposed in a corresponding imaging plane of the imaging system. For example, the surface of the optical chip may include one or more input ports and/or output ports. When input light is directed onto the chip surface, some of this light may or may not enter an input port while the rest of the input light is reflected off the chip surface. The reflected light may appear to originate from a spot where the input light hits the chip surface. Accordingly, the reflected light can be received by the imaging system and projected in a corresponding location of the image plane, i.e. detector. The location where the reflected input light is detected may thus correlate with the location where the input light was directed onto the optical chip surface. Similarly, output light from one or more output ports on the chip surface may be received by the imaging system and projected onto corresponding locations of the detector in the imaging plane. The relative spatial locations where the (reflected) input light and (resulting) output light is imaged on the detector may thus be used to determine relative locations where the input light spot hits the surface of the optical chip. Advantageously an (e.g. actuator) position of the input light on the optical chip can be based a (pixel) position of the output light and/or (pixel) position of the reflection of the input light in the spatially resolved image. For example, the position can be determined in an absolute sense based on a position of the reflection in the image, or relative to output light from the one or more output ports, which are part of the optical chip. Alternatively, or additionally to comparing with the reflected input light, the position of the output light can also be compared e.g. to a previous calibrated position of output light in a previous image (where the chip position was calibrated, e.g. as described herein). When no output light is received, e.g. no input light enters an input port, a position and/or extent of the input light may be varied until the output light is observed. Once the output light is detected, a position and/or extent of the input light spot may be varied again e.g. to optimize light entering the input port. Advantageously, the same detector that can be used for aligning the input light on the chip can also be used for measuring a spectral response of the chip. For example, the spectral response can be derived from an intensity of the output light in a respective image measured by the detector. For example, the input light can be set to a specific wavelength to measure the response of the chip at that wavelength, or the wavelength can be varied while measuring the corresponding output intensity as function of wavelength. Also broadband light can be used, e.g. in combination with a spectral resolving element or spectral filter between the chip and the detector.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
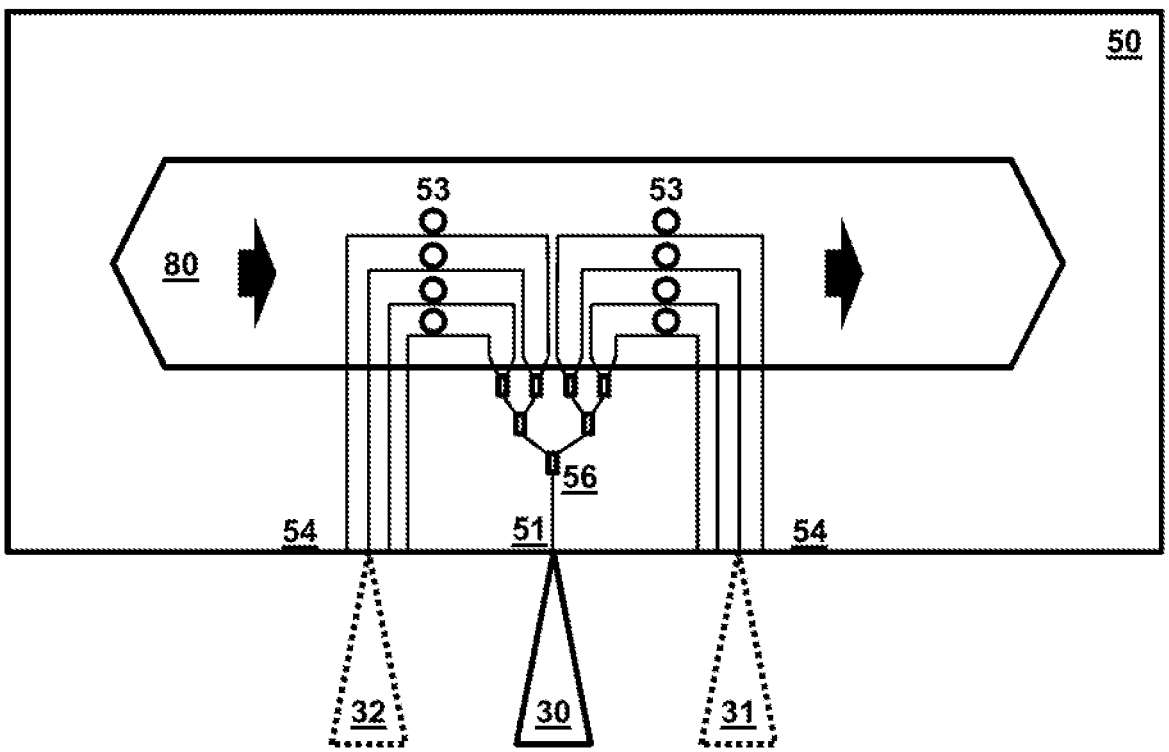
FIGS. 1A, 1B, 2A illustrate example layouts of an optical chip.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

Aspects of the present disclosure relate to methods and systems for interrogating a photonic integrated circuit (PIC) also referred to as an optical chip. In a preferred embodiment, the chip is interrogated via a free space optical connection between an instrument and the chip in order to read-out the chip. This may be easier to operate than e.g. connecting optical fibers to the chip. In a preferred embodiment, light from a laser is coupled into the chip via an input structure on the chip. In some embodiments, the input structure comprises a waveguide at an edge (side) of the chip. In other or further embodiments, the input structure comprises a vertical grating coupler on the surface (face) of the chip. In a preferred embodiment, light emitted from the chip is captured and imaged on a detector array. For example, a detector array is used to simultaneously collect light from multiple outputs of the chip, originating from multiple optical (sensor) structures on the chip.

The term "image" or "imaging" as used herein will be understood in its usual meaning as providing a projection reproducing (at least some of) the spatial layout of an object, or at least the light from that object, analogous to how an image of an object or scene is recorded by a camera. Typically, an object in an object plane of a projection or imaging system is imaged in a corresponding image plane of the projection system wherein spatial dimensions of the object are projected onto spatial dimensions of the image. Accordingly, at least some of the spatial information of the object may be preserved in the imaging. To emphasize this feature, the term "spatial image" or "spatial imaging" may be used. For example, the spatial information may be read out by a detector by projecting the image onto a plurality of sensing elements (pixels).

Preferably, the signals from output ports of different on-chip sensors are spatially separated, such that they can be separately measured. In other words, the light from the individual sensors is preferably outputted from different, well-separated, parts of the detector. Hence light from specific array elements can be attributed to specific and known sensors on the chip.

In some embodiments, (narrow band) input light is wavelength modulated during read-out, e.g. across a limited wavelength range, typically a few nanometers wide. The process of performing a complete wavelength cycle can be referred to as a scan. During each scan, the detector array may take multiple images, such that a corresponding number of optical power values are obtained for each individual chip output. From these, the optical response (optical transmission of the sensors as function of wavelength, also called "spectrum") can be reconstructed for each scan and correlated to a previous scan. In some embodiments, changes in the spectra with respect to a previously recorded spectrum can be attributed to the sensors responding to the substance or physical property that it is sensitive to (e.g. in case of bio-sensing, the binding of biomolecules to the sensor surface).

In other or further embodiments, the input light comprises a relatively broad band of different wavelengths which may enter the optical chip to perform simultaneous measurement at multiple wavelengths. The optical chip may similarly output a spectrum of wavelengths, depending on the measurements of respective sensor elements on the chip. In some embodiments, the output spectrum may be spectrally resolved and measured by the detector. For example, a spectral resolving element such as a grating or prism may be arranged in light path between the optical chip and detector to project spectrally resolved images. Typically, the one or more output ports of the optical chip may be shaped as a relatively small light spots or dots in the object plane. Accordingly, the small light spot may be imaged as a line of spectrally resolved spots in the imaging plane. From the distribution of intensities along the spectrally resolved line, a spectral signature of the light can be determined. For example, the detector comprises a two-dimensional grid of detector elements wherein a spectral axis of the output light is projected along one direction. In some embodiments, the output ports may all be arranged along a line (e.g. on an edge of the chip), which line is along a direction transverse to the spectral resolving direction. Accordingly, the output light from different ports may be projected as a number of parallel spectral lines on the detector surface. In some embodiments, the image may include a spectral line of the reflected input light. Optionally, this can be used as a reference, e.g. for normalizing a spectrum of the output spectral lines. It will be appreciated that the relative positions of the spectral lines can also be used to align the input light spot with respect to the output ports, or the spectral resolving element is temporarily removed, or by-passed during alignment. It can also be envisaged to have one dominant (more intense) wavelength for alignment in the spectrum. Alternatively, or additionally, the light spectrum of the input light can be varied during alignment, e.g. set to a single wavelength; or a spectral filter can be (temporarily) inserted anywhere in either the input or output light path.

In some embodiments, the optical chip comprises optical sensor elements such as ring resonators, interferometers (e.g. Mach-Zehnder interferometers, 3-port interferometers), arrayed waveguide gratings et cetera. For example, the optical elements may be employed as sensors by exposing at least part of the waveguides to a sample (liquid or gas) of which a property or contents needs to be measured. In some embodiments, the sample may be flowed across the chip surface. Also stagnant samples may be used, or the chip moved in a sample. In some embodiments, the chip is used as a biosensor. In other or further embodiments, the chip comprises sensing elements that are or can be individually functionalized with capture molecules, e.g. antibodies or DNA probes, such that they are all sensitive to a different biomolecule (e.g. a protein or a oligonucleotide). Once a sample flows or otherwise contacts the chip surface and biomolecules bind to the capture molecules, the refractive index can be locally changed in some embodiments, resulting in a change in the optical response of the sensor elements. This change in optical response can be detected by applying light, for instance at different wavelengths and collecting light back from the outputs of the sensing elements.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
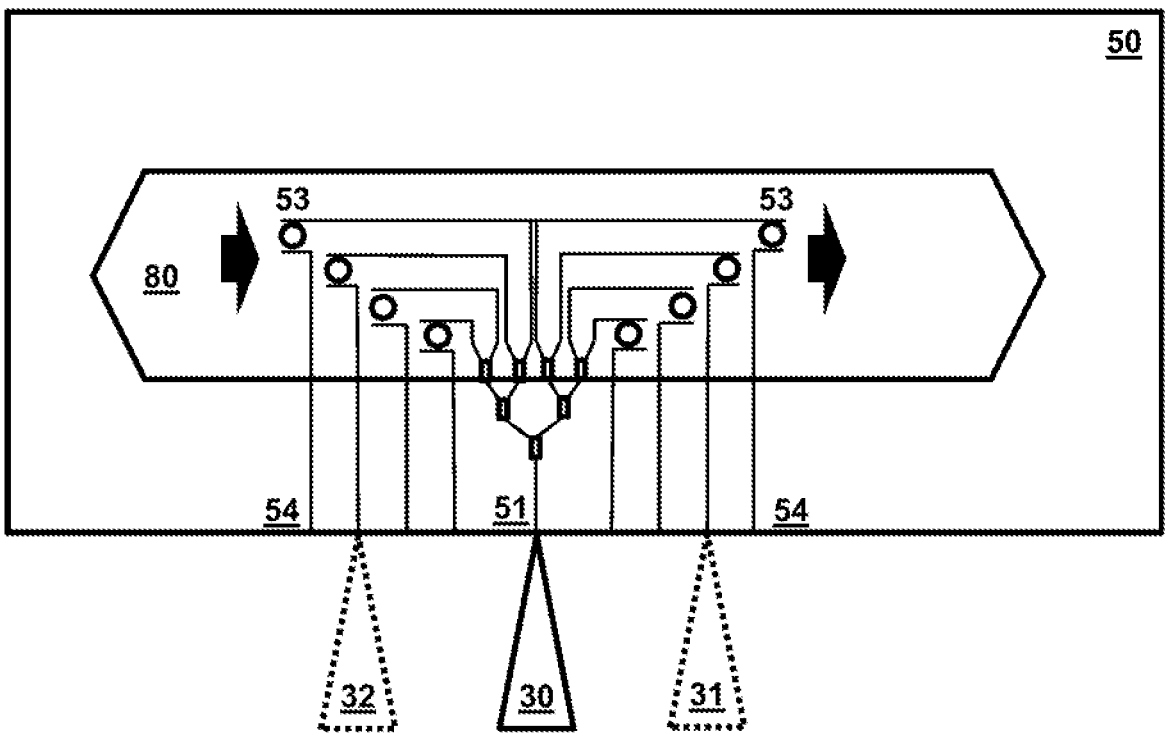

FIGS. 1A and 1B illustrates embodiment of respective optical chips 50. Typically, the optical chip 50 comprises (optical) waveguides to guide light between at least one sensor input ports to one or more sensor output ports, via one or more optical sensor elements.

In the embodiments shown, the optical chip 50 comprise an input structure 51, in this case having one input port. For example, the input structure 51 is coupled to a waveguide extending to an edge of the optical chip 50. Light from the input waveguide may be coupled to one or more optical sensors 53, e.g. ring resonators as shown here. In some embodiments, the waveguide can be split into multiple different waveguides, e.g. using y-splitters or multi-mode interference, MMIs 56, where e.g. 1×2 spitting or 1×8 splitting can be performed, or star couplers. Accordingly, light that enters the chip via the input structure 51 can be distributed across multiple optical sensors 53, e.g. evenly or unevenly distributed.

In one embodiment, e.g. as shown, the light exiting the optical sensors, is transported back to an edge of the chip to an output structure 54 which may have one or more output ports. In the case of FIG. 1A the output ports are connected to respective through ports of the ring resonator. In the case of FIG. 1B the output ports are connected via a respective drop ports of the ring resonator. In some embodiments (not shown), light may also be combined from multiple waveguides, e.g. combining the signal.

In some embodiments, e.g. as shown, a flow 80 is guided across a surface of the optical chip 50. For example, the solid arrows indicate a direction of the flow, which can be in any direction. In some embodiments, the chip comprises a flow structure or channel to guide the flow, e.g. across a surface of the chip comprising one or more of the optical sensors 53

In a preferred embodiment, e.g. as shown, the output structure 54 is disposed on the same edge or face of the chip as the input structure 51. In other words, light is preferably (all) coupled out of the optical chip 50 at the same side as where it is coupled in. Advantageously, this may allow recording an image of both the input light 30 as its light spot is reflected off the optical chip 50, as well as any (separate) output light 31,32 exiting from the output structure 54 of optical chip 50. In some embodiments, a relative position of the input light spot with respect to one or more output light spots is determined. For example, the output light spots may be correlated to an actual position of one or more ports of the output structure 54 on the chip or a separate alignment structure (not shown), e.g. configured to reflect light from one or more known spots on the chip when input light falls on the alignment structure.

Some embodiments comprise aligning a position of the input light on the optical chip based on the reflection of the input light. In a preferred embodiment, a relative position of the input light spot with respect to one or more output light spots is used to align the input light and/or chip. For example, the input light spot 30 is moved in a direction corresponding to a known relative position of the input structure 51 on the chip with respect to the output structure 54, e.g. detected as one or more output light spots 31,32. In some embodiments, the optical system has access, e.g. stores or reads out, information about the relative positions (distances, orientation) of the input and output ports on the chip. The relative positions on optical chips handled by the device e.g. can be standardized, or unique for each type of chip. In some embodiments, information such as the relative positions can be read from the chip itself, e.g. using a barcode or RFID. In some embodiments, a relative position of the input and output ports is determined from an imaging of the chip. In some embodiments, a relative position of the input and output ports is determined during an alignment procedure on one type of chip which can be re-used for another chip of the same type. In some embodiments, a position of the input port is inferred, e.g. based on symmetry. For example, in the embodiment shown, the input structure 51 is disposed at a center between different ports of the output structure 54. Accordingly, alignment may e.g. comprise moving the light spot of the input light 30 to a center between light spots of the output light 31,32.

Figure 2A:
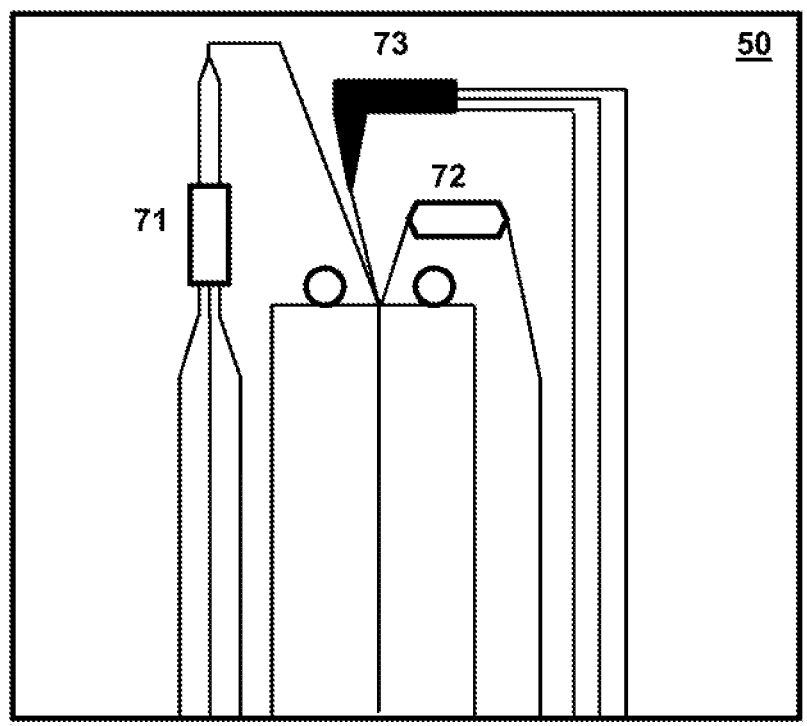

FIG. 2A illustrate another example of an optical chip 50. In the embodiment shown, the chip carries various types of optical sensors: ring resonators, a Mach-Zehnder interferometer 72, a 3-port interferometer 71 and an arrayed waveguide grating or AWG 73. Of course many variations can be envisaged.

Figure 2B:
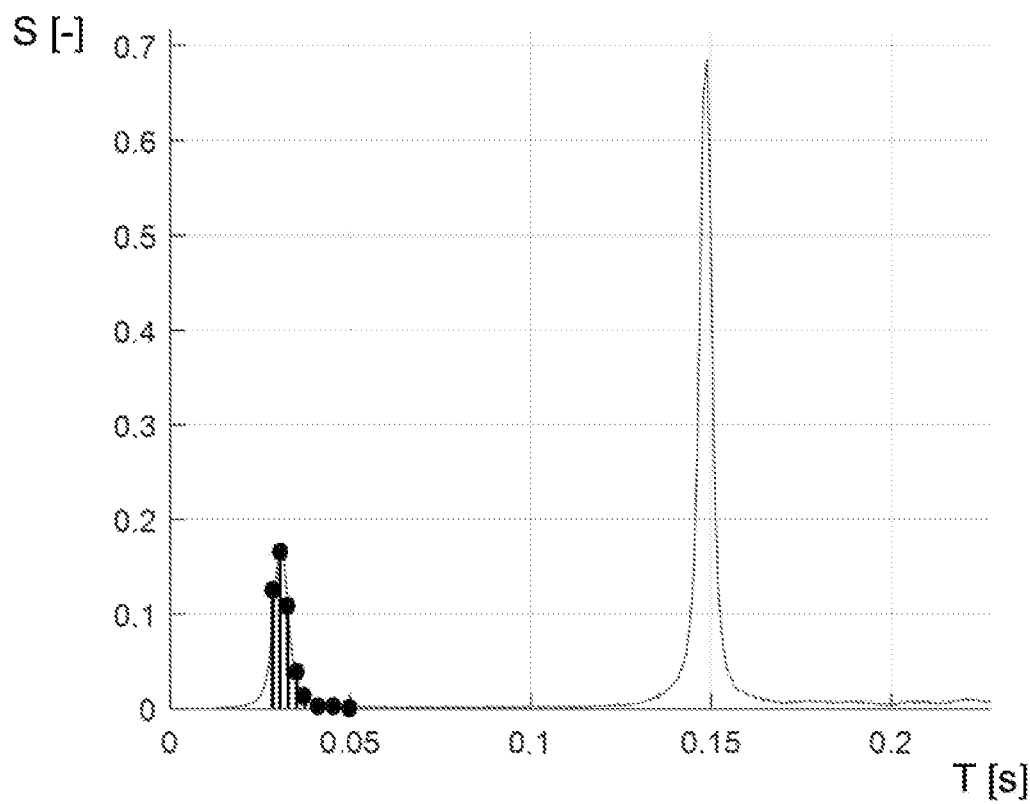
FIG. 2B illustrates an example measurement.

FIG. 2B illustrates an example reconstruction of a signal "S" taken from a particular region of interest, e.g. optical power as function of scan time "T". In a typical measurement of these or other optical chips, a laser beam is modulated in wavelength during a scan time, and a detector array samples the optical power in every defined regions of interest (around a sensor output port) and a large number of times (e.g. 1000) during the scan. In this case the signal was obtained from the drop port of a ring resonator and the peaks correspond with times that the wavelength was such that resonance occurred. For clarity, some individual sampling signals obtained with the detector array are indicated by closed circles, which combined with all other sampling signals make up the full signal. In the case of using the ring resonator as a biosensor, the wavelength where resonance occurs (and thus the time during the scan when a resonance occurs) typically depends on the amount of biomolecules that are captured on the sensor surface. Hence this information can be used to estimate the amount of bound molecules, which can be a measure for the concentration of the molecule in the sample and/or the affinity of the capture molecule for the molecule in the sample or vice versa.

Figure 3A:
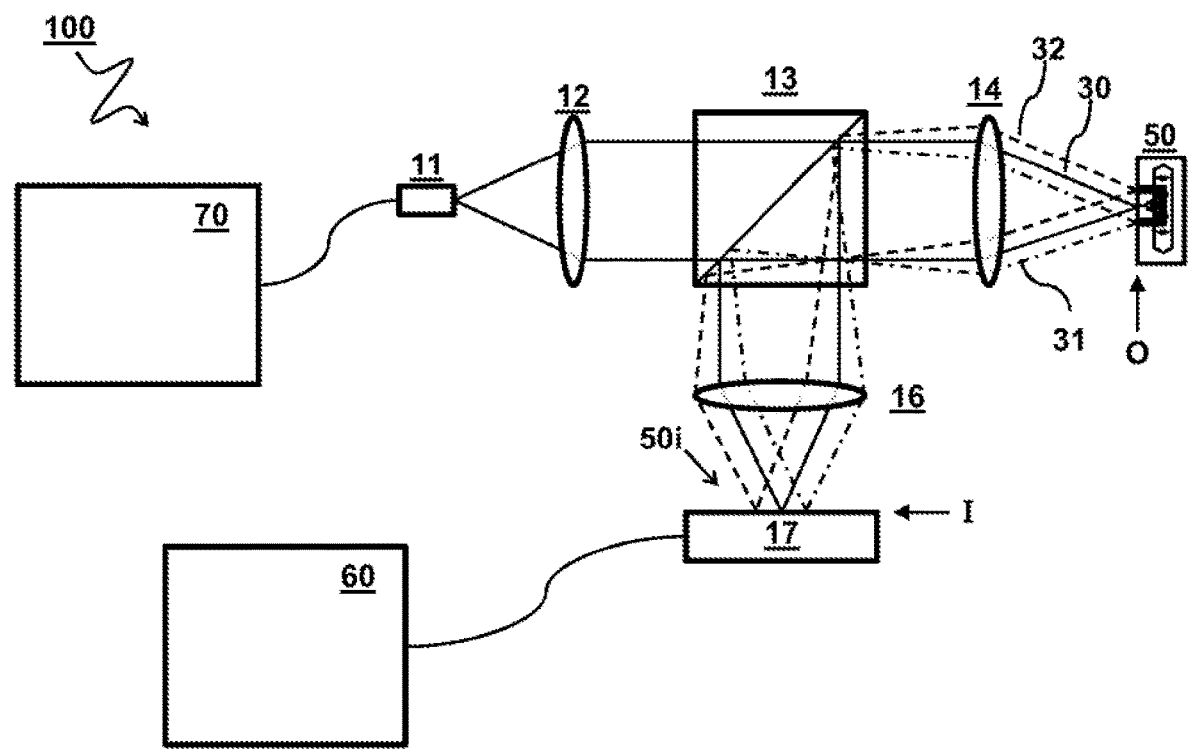
FIG. 3A illustrates an embodiment of a system for interrogating an optical chip.

FIG. 3A illustrates an embodiment of a system 100 for interrogating an optical chip 50.

In one embodiment, the system comprises a chip holder (not shown) configured to hold a surface of the optical chip 50 in an object plane "O". For example, the chip holder comprises one or more abutment surfaces or stops to provide a course initial alignment of the chip. In the embodiment shown, a light source 11 is configured to generate input light 30 and illuminate at least one input port 51 of the optical chip 50 with a light spot of the input light 30. In some embodiments, a detector 17 with a plurality of detection elements is disposed at an imaging plane "I" and configured to measure one or more light intensities of output light 31,32 from one or more output ports 54,55 of the optical chip 50.

In a preferred embodiment, an imaging system 14,16 configured to project a spatially resolved image 50i of output light 31,32 from the object plane "O" where the surface of the optical chip 50 is held, onto the imaging plane "I", where the detection elements of the detector 17 are disposed. Most preferably, the system is configured to project a focused light spot of the input light 30 onto the object plane "O" of the imaging system 14,16 where the input port 51 is disposed at the same surface of the optical chip 50 as the one or more output ports 54,55. Accordingly, a reflection of the light spot of input light is imaged on the detector 17 together with the output light 31,32.

In a preferred embodiment, the system is configured to align a position of the input light 30 on the optical chip 50 based on the reflection in the spatially resolved image 50i measured by the detector 17. Most preferably, the system is configured to use the same detector for measuring a spectral response of the optical chip 50 based on the output light 31,32 in the same or another spatially resolved image 50i. It will be understood that the spatially resolved image 50i can change as a function of time. For example, the image can be continuously measured (refreshed) and used in a feedback loop to align the chip. Also the measurement of the spectral response can involve measuring the intensity of the output light in a respective image at one or more instances of time, e.g. while varying a wavelength of the input light 30. In one embodiment, the alignment occurs simultaneous with the measurement of the spectral response, e.g. in one image 50i measured by the detector 17 at the same instance of time. In another or further embodiment, the alignment precedes the measurement of the spectral response, e.g. in an image 50i measured by the same detector 17 at another instance of time.

In some embodiments, the system is configured to align a position of the input light spot with respect to an input port 51 of the optical chip 50 based on a position and/or shape of the measured reflection of the light spot of input light 30 in the image 50i relative to a position and/or intensity of one or more distinct spots of the output light 31,32 at a distance from the input light spot.

In one embodiment, as shown, the system comprises a light source such as a laser 11 for generating input light 30. Typically, a wavelength and/or power of the input light 30 is controlled by a laser driver 70 which may be separate or integrated in the laser. In some embodiments, the system comprises a collimator 12 to collimate the laser beam. In another or further embodiment, the light from the laser is already collimated.

In a preferred embodiment, the system 100 comprises an imaging system configured to project a spatial image 50i of the optical chip 50, arranged with its surface in an object plane "O", onto a detector 17 arranged at a corresponding imaging plane "I". For example, the imaging system may be formed by one or more lenses (as shown), and/or curved mirrors (not shown). For example, the imaging system comprises an objective lens 14 that focusses the laser beam on the input structure on the chip 50. In some embodiments, as shown, the same lens may be configured to collimate the light collected from the outputs of the chip. In some embodiments, the imaging system comprises a second objective lens 16 to focus (image) the light on a detector array 17 and a processing unit to process the detector array signals to information. In other embodiments (not shown), it can be envisaged that the imaging system comprise only one lens or mirror; or more than two lenses or mirrors; or combinations of lenses mirrors, or any other projecting optical elements.

In a preferred embodiment, e.g. as shown, the system comprises a beam splitter 13 to split input and output light beams. Most preferably, all in- and outputs of the optical chip are on the same chip edge, and input and output beams are transmitted via the same objective lens. Accordingly, the size of the optical path (and thus the instrument) can be greatly reduced. Alternative to the shown arrangement, a laser spot may also be projected onto the chip via a separate projection system, or no projection system at all. For example, a laser spot may be directly projected by the laser onto the chip from a side not traversing the projection system.

In some embodiments, interrogating an optical chip comprises alignment of input light onto an input port of the optical chip before reading out the optical chip. In one embodiment, the chip is placed against end stops of a readout instrument. The end stops may help with the alignment, e.g. restrict possible movement. For example, a front surface or edge of the chip may abut end stops of the instrument to place the surface in an object plane of an imaging system. Also other or further end stops may be used. For example, a bottom face of the chip may be place on a chip holding surface. Some end stops or abutment surfaces of the instrument may be moveable to fine tune alignment of the chip. Alternatively, or additionally the light beam of input light may be variable with respect to the chip holder.

In some embodiments, interrogating an optical chip comprises readout of signals. For example, reading out the optical chip may comprise one or more of generating laser light (preferably with modulated wavelength), projecting the laser light (of different wavelength) onto the on-chip input structure, receiving light back from on-chip output structures and projecting this onto a detector array for measurement. In some embodiments, optical signals measured by the detector are converted to the electric domain. For example, the electrical signals may be processed in a processing unit In one embodiment, a method of interrogating an optical chip 50 comprises illuminating the optical chip 50 with input light 30; and measuring a spatially resolved image 50i of output light 31,32 from the optical chip 50. In a preferred embodiment, the output light 31,32 is imaged together with a reflection of the input light 30. These and other methods may also be embodied as a (non-transitory) computer-readable medium storing instructions that, when executed by one or more processors, cause a device (e.g. system 100) to perform the methods described herein.

Figure 3B:
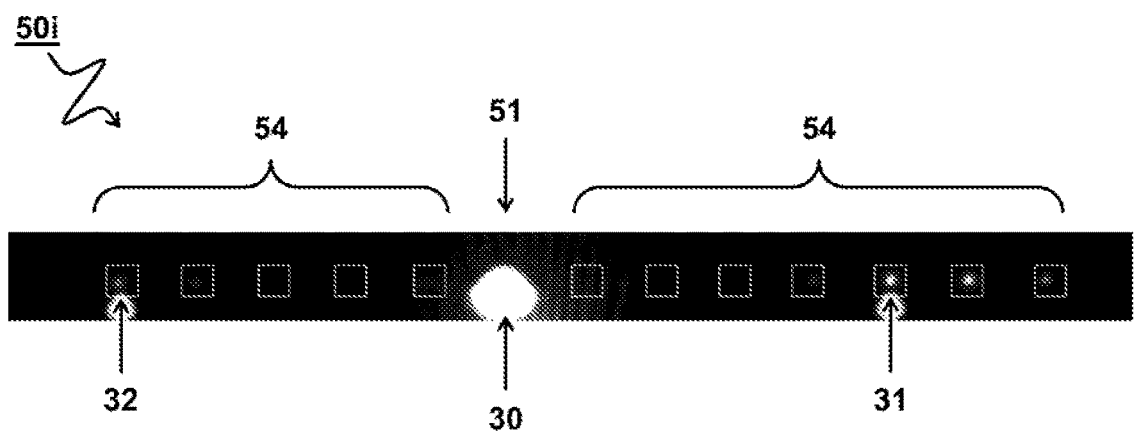
FIG. 3B illustrates an image of light spots from a surface of an optical chip.

FIG. 3B illustrates an example image 50i of the optical chip 50. In some embodiments, the spatially resolved image 50i comprises an image of a chip surface at one side of the optical chip 50. For example, the chip surface comprises one or more input ports 51 for receiving the input light 30, and one or more output ports 54 for emitting corresponding output light 31,32. Preferably, the input and output ports are disposed on the same side of the optical chip 50. In other or further embodiments, the output light is emitted from a chip surface of the optical chip 50, and the input light 30 is reflected from the chip surface. For example, the input and output light from the chip surface is projected by an imaging system 14,16 onto a detector 17. Typically, the imaging system 14,16 is disposed in an optical path between the optical chip 50 and the detector 17. For example, the optical chip 50 is disposed in an object plane "O" of the imaging system 14,16 and the detector 17 is disposed in an imaging plane "I" of the imaging system 14,16.

In a preferred embodiment, the spatially resolved image 50i is projected onto a detector 17 comprising a plurality of spatially distributed detector elements to simultaneously measure a spatial distribution of light intensities of the spatially resolved image 50i including intensities of the input light 30 and output light 31,32. In other words, it may be preferred to use wide field imaging as opposed to confocal scanning.

In a preferred embodiment, a position of the input spot on the chip and the different output spots of the chip is observed simultaneously in by a camera image. In some embodiments, the image may be used to provide feedback on to how to shift the input spot to obtain optimal coupling. The middle white spot is the spot of input light 30, which is laser light that is reflected back from the facet (side) of the chip (hence, this light does not enter the chip). The smaller spots in the squares to the left and the right are the spots of output light 31, 32, from respective ports of the output structure 54 (indicated by squares in FIG. 3B).

In some embodiments, a relative position of one or more input ports 51,52 of the optical chip 50 with respect to (one or more light spots of) the input light 30 illuminating the optical chip 50 is determined based on position of (one or more light spots of) the output light 31,32 emitted from one or more output ports 54,55 of the optical chip 50 with respect to a reflection of (the one or more light spots of) the input light 30. Additionally, information regarding a (predetermined) relative position of the input structure 51 with respect to the one or more output ports 54,55 on the optical chip 50 can be used. In a preferred embodiment, the one or more input ports 51,52 and one or more output ports 54,55 are disposed on a same side of the chip, preferably in the same plane, i.e. same flat side e.g. same edge or face. This may considerably facilitate alignment. Alternatively, the ports may be on different faces, but still in the same image. This can make it more difficult to align, e.g. taking into account perspective, and more difficult to sharply image (focal plane).

An example alignment procedure may be as follows. As soon as one or more of output spots are observed, the position of the input structure of the chip in the image can be calculated, e.g. because the layout of the chips is a-priori known. Based on that, the input spot can be moved from its current location to the optimal position for maximal coupling. In some embodiments, this is done by calculating the difference in one or more dimensions (e.g. x and y position) between the input spot and the known location of the chip input structure and subsequently commanding an x-stage and/or y-stage attached to the laser (or chip holder) to reposition the laser such that the input spot coincides with the location of the chip input structure. Alternatively or additionally, the objective lens or the collimator can be actuated. For each chip inserted in the instrument, the output spots may be in a slightly different position, e.g. due to variation during chip manufacturing such as dicing tolerances (which results in variation in x-position) as well as the tolerance in wafer thickness (which can give variation in y-position).

The squares shown in FIG. 3B indicate regions of interest (ROI) for each output spot of the chip. The light incident on the detector elements in each square corresponds to a different on-chip sensors and is converted to the electrical domain for further processing. Once light exits the chip from the output spots, the input structure position can be determined. The input spot should therefore be in a position that at least some light enters the chip. In order to aid the alignment it is preferable to arrange the waveguides on the chip such that part of the light received by the input structure is guided directly to a dedicated alignment output structure, such that under every condition light exits at least one output if light enters the chip. Several methods can be envisaged to obtain this so-called first light as will be discussed in the following.

Figure 4A:
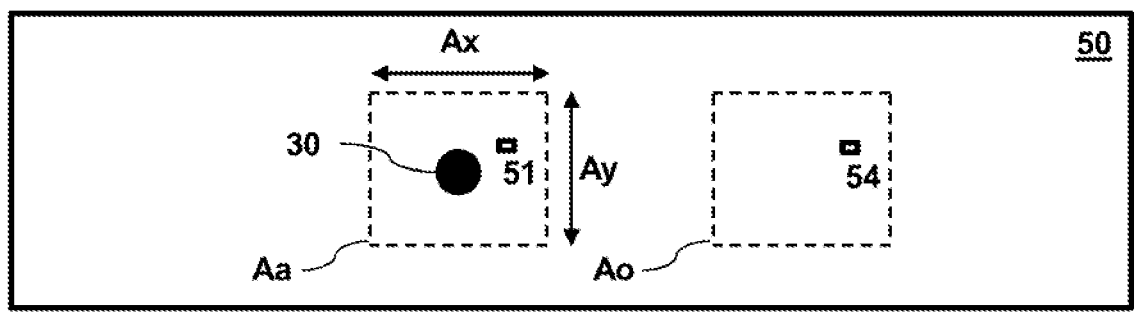
FIG. 4A illustrates scanning a light spot over a chip surface.

FIG. 4A illustrates a part of an optical chip (50) and its input structure (51) where input light can be coupled into the chip, which is then distributed via waveguides across the chip to for instance, different sensor elements. The spot of input light 30 generated by the laser beam e.g. starts at a nominal position of the chip input structure, e.g. by proper design of the optical path upon insertion of a chip in the instrument. However, due to dicing tolerances and wafer thickness tolerances the actual position of the input structure may vary. For example, the actual position is known to vary within an alignment area "Aa" with a height "Ay", e.g. defined by the wafer thickness tolerances, and a width "Ax", e.g. defined by dicing tolerances. Preferably, the position of the input spot is aligned to coincide with the actual position of the input structure to obtain proper optical coupling between the instrument and the chip.

In one embodiment, using a chip with edge coupling structures, the input spot is positioned on the edge of the chip, while in another or further embodiment, using a chip with vertical grating couplers as input, the input spot is positioned on the top surface of the chip. The methods disclosed here are in principle applicable for both types of chips. With surface coupling the thickness tolerance is not important. In that case dicing tolerances (for each side of the chip) may define the alignment area.

In some embodiments, a position of the input light 30 on the optical chip 50 is aligned with respect to a sensor input port 51 of the optical chip 50 based on a relative position of the output light 31,32 in the image 50i with respect to a relative position of the reflection of the input light 30 in the image 50i. In other or further embodiments, a position of an output structure 54 of the optical chip 50 is determined by determining a position of one or more light spots of the output light 31,32. In other or further embodiments, an at least initial overlap of the input light 30 with one or more input ports 51,52 of the optical chip 50 is established by scanning a position of the input light 30 over an alignment input area Aa, wherein an extent Ax, Ay of the scanned alignment input area Aa is based on predetermined variation of the input port position between different chips.

In some embodiments, e.g. as shown, an at least initial overlap of the input light 30 with one or more input ports 51,52 in a predetermined alignment area Aa of the chip surface is determined by detecting a light intensity of one or more spots of output light 31,32 in an observation area Ao outside the alignment input area Aa. In other or further embodiments, a distance of the input light 30 relative to a sensor input port 51 at a first location of the optical chip 50 is decreased by maximizing an intensity of measured output light 31,32 at a distinct second location on the chip corresponding one or more sensor output ports 54,55. For example, the input light spot has relatively high intensity at its centre (e.g. Gaussian profile), wherein the alignment is improved by moving this center to overlap the sensor input port.

In one embodiment alignment of the input spot onto the input structure is obtained by scanning through the alignment area Aa. The input spot is repositioned and at each new position the light power exiting from at least one output port (54), which is known to be relatively positioned in an observation area "Ao" is monitored, e.g. by summing all optical power signal from the observation area. Preferably, the observation area "Ao" is well separated from the input area "Ai" to distinguish the input light spot from possible output light.

In some embodiments, repositioning or scanning is done in such a way that the complete alignment area is systematically covered at least once during the scanning process. For example, the repositioning steps are smaller than the spot diameter. If light is observed in an area outside the input area, it can be attributed to at least one of the output structured and it is then known that at least part of the input spot falls on the input structure. Subsequently a fine alignment can be performed. This can be done by repositioning around the position found during coarse alignment with smaller steps until a location is found where maximum optical power exits at least one output structure. Another, faster and therefore preferred fine alignment procedure is to calculate the position of the input structure from the position of the light received from the chip via at least one output structure and the knowledge of the position of each structure on the chip. Subsequently, the input spot can be repositioned to the calculated position at once.

In some embodiments (not shown here), a position y of a spot of the input light 30 on a face of the optical chip 50 is adjusted based on a shape of the spot in the image 50i. In other or further embodiments (not shown), an at least initial overlap of the input light 30 with one or more input ports 51,52 of the optical chip 50 is established by initially increasing a spot size of the input light 30. Preferably, the spot size is decreased after the at least initial overlap is established, e.g. to admit more light into the sensor input port. For example, the spot size is increased or decreased by shifting a focal plane of the input light 30 with respect to a surface of the optical chip 50.

Figure 4B:
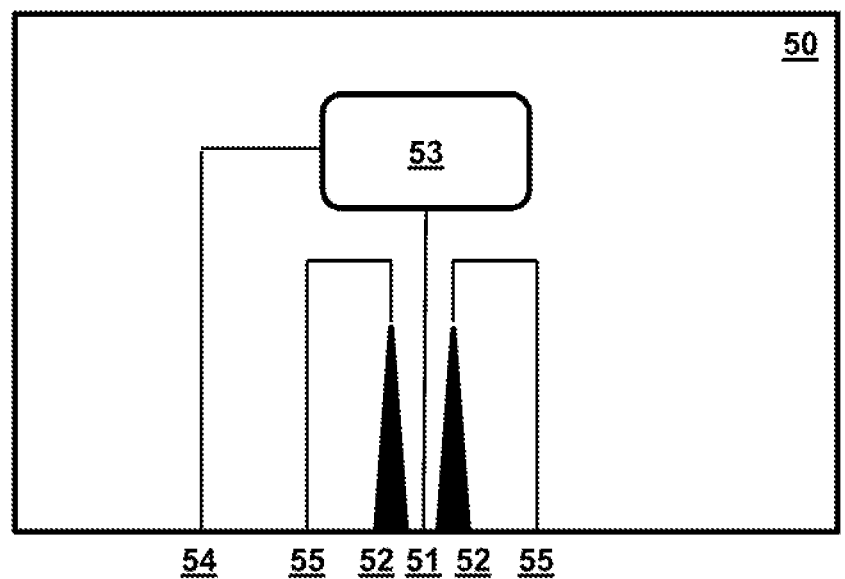
FIG. 4B illustrates an optical chip with alignment ports.

FIG. 4B illustrates a top view of an embodiment, wherein alignment is performed making use specific alignment structures on the chip 50.

Typically, the optical chip 50 comprises at least one sensor input port 51 and a corresponding set of one or more sensor output ports 54 connected to the sensor input port 51 via a respective set of waveguides, wherein light traveling along a respective waveguide between the sensor input port 51 and a respective sensor output port 54 interacts with one or more optical sensor elements 53 there between, wherein a spectrum of the output light 31,32 with respect to the input light 30 is determined by a sensor measurement of the one or more optical sensor elements 53.

In some embodiments, a position of the input light 30 on the optical chip 50 is aligned with respect to a sensor input port 51 of the optical chip 50 based on a relative position of the output light in the image with respect to a calibrated output position. For example, a position of the input light spot is aligned with respect to an input port 51 of the optical chip 50 based on a measured (pixel) position of one or more distinct spots of the output light 31,32 in the image 50i, relative to a calibrated (pixel) position of corresponding one or more distinct spots of the output light 31,32 in a previous image 50i.

In some embodiments, the input light is first optimally aligned on a first chip held at a specific position of an interrogator system, and a position of the output light for the aligned chip in the image is recorded as the calibrated output position. Alternatively, or in addition, the optimal position of the input spot may be recorded as calibrated input position. In other or further embodiments, when a second chip is placed in the system (e.g. with the same settings), the position of the output light can be different than the previous calibration position, e.g. due to slight misplacement or other variation. In some embodiments, the second chip is aligned based on the measured position of its output light in the image compared to the calibrated output position. In one embodiment, when a specific shift (positional difference) is measured between a current measured position of the output light from the current optical chip and a previous calibrated output position of a previous aligned optical chip, the shift can be applied to the position of the input light with respect to the current optical chip to achieve a similar alignment as the previously.

In some embodiments, a calibrated position is determined by recording both a relative position of the projected light spot with respect to the chip is (e.g. a positional setting of an actuator, such as a piezo, configured to move the chip and/or light spot), as well as a position of one or more output light spots in the image (e.g. pixel position). In another or further embodiment, a current chip is positioned using the calibrated actuator and pixel positions, as well as a current pixel position of the output light spots from the current chip. When the current pixel position deviates from the calibrated pixel position, the current actuator position can be changed accordingly, e.g. by applying a corresponding shift relative to the calibrated actuator position. In a preferred embodiment, a relation between a shift in the actuator position and a shift in the pixel position is also calibrated. For example, a controller stores how much the actuator position needs to change for shifting light spots in the image by a specific number of pixels. In this way, the alignment can be relatively fast. Alternatively, or additionally, a feedback loop can be used wherein the current pixel position is compared to the calibrated pixel position and the actuator position is varied to minimize a distance between these positions.

In some embodiments, a system for interrogating optical chips can provide a specific position for placement of the chips, wherein the system is configured to project a spot of input light on a surface of the chip when it is held in the specific position, and project an image of the chip surface onto a detector. For example, the position of where the input light spot is projected on the chip can be determined by an electrical signal to a (piezo) actuator configured to move a chip holder and/or the light spot itself (e.g. moving a mirror or lens). To increase the chance of at least some light being detectable from one or more of the output ports, a size of the input light spot and/or a size of one or more input ports can be made relatively large.

In some embodiments, e.g. as shown, the optical chip 50 comprises one or more alignment input ports 52 and corresponding alignment output ports 55 connected via respective waveguides without optical sensor element 53 there between, wherein the one or more alignment input ports 52 comprise a tapered input structure to increase an extend of the alignment input ports 52 accepting the input light 30. When light enters an alignment input port, this may result in a corresponding light signal from one or more corresponding alignment output ports 55. As will be appreciated, the alignment output ports can have a relatively small diameter (compared to the alignment input port) so the position of respective output light from those ports can be used for relatively accurate alignment, irrespective where light falls on the relatively large alignment input port. In one embodiment, the alignment structure may comprise a simple wave guiding structure between the input and output alignment ports. For example, the alignment structure does not need to pass by any optical sensors 53 as the only task is to redirect the light to a corresponding port. Accordingly, the alignment input ports 52 can be separate from the actual input structure 51.

In one embodiment, e.g. as shown, the one or more alignment input ports 52 comprise one or a combination of multiple tapered waveguides. In some embodiments, these can have a total width that is relatively large, e.g. such that the width of the combination of left alignment structure, the input structure and the right alignment structure is larger than the width of the alignment area Aa. Each alignment structure is coupled to a specific alignment output structure 54.

In some embodiments, only light entering the input structure 51 is further distributed across the chip to functional chip area 53 where for instance optical sensors such as ring resonators of interferometers may be present. For clarity FIG. 4B also shows one of the output waveguides that are used to transport light back from the functional chip area to an output structure 54 where light exits the chip and is e.g. collected by the objective lens and imaged on a detector array (not shown here).

Figure 5A:
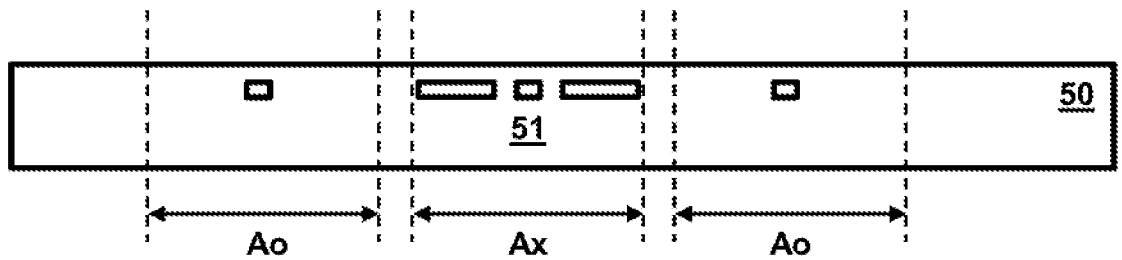
FIGS. 5A and 5B illustrate front views of a chip with alignment ports and scanning a light spot.

FIG. 5A illustrates a side view of an optical chip 50 e.g. corresponding to the top view of FIG. 4B. The figure illustrates the nominal position of the input structure which may vary within in the alignment width Ax. Left and right of the alignment area are observation areas Ao for which is it known any light incident on the alignment structures will exit the chip. During system design, care can be taken to ensure that the observation areas do not overlap with the alignment area.

Figure 5B:
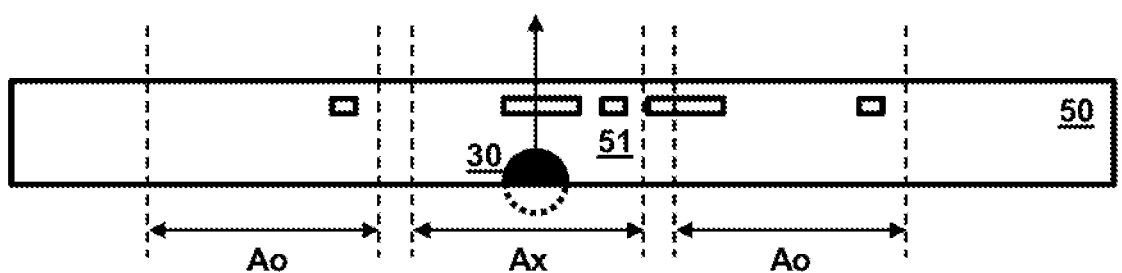

FIG. 5B illustrates a possible actual position of in and out-coupling structures after insertion of the chip in the instrument. For example, it may be known that in the nominal x-position of the input spot, when the spot is scanned in the y-direction, eventually light will enter the input structure and/or one of the alignment structures such that some light is always received back from the chip. Note that it is assumed that also when light only enters the input structure, light is always received back from one of the chip output structures. In the case of FIG. 5B light will at some time during the y-scan enter the left alignment structure, which results in light exiting the chip via the output structure located in area Ao. This indicates that the input spot should be repositioned to the right and the exact amount of repositioning can be precisely calculated from the location where light is observed in area 28, and the current position of the input spot, or by comparing the location where the light is observed with a previously recorded calibrated output position.

In some embodiments, an optimal (y) position of the input light may be determined based on a shape of the reflected light spot. For example, in FIG. 3B the shape of the input spot is not circular. This is always the case when in the correct y-position, due to the fact that the input structures are close to the top surface of the chip (e.g. 8 μm below), such that the input spot falls partly on the chip and partly misses it. This allows for determining the correct y-position based on the shape of the input spot. If the spot is circular the input spot has a too low y-position. If no spot is observed the input spot misses the chip completely (the y-position is too high). In the correct position the spot may have specific shape, e.g. circular optionally with a flat edge on a predetermined side (depending where the input port is located). The spot shape observed in the camera image can be compared (e.g. on size and/or shape) with a stored image and deviations between observed image and stored image can be used to adjust the y-position.

Figure 6A:
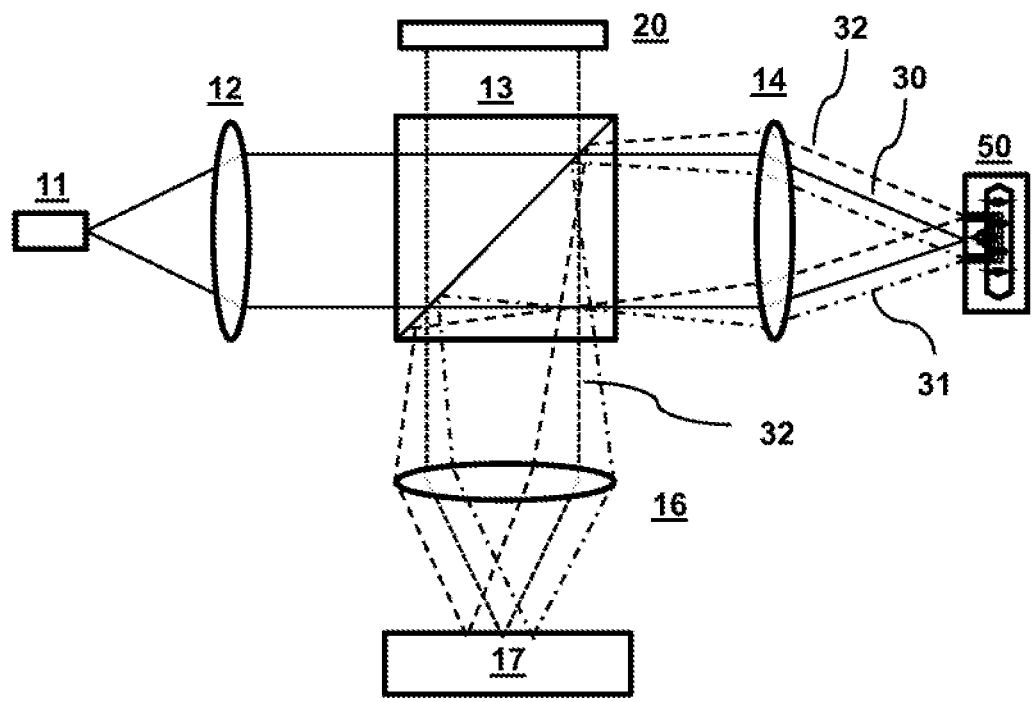
FIGS. 6A,6B,7A,7B illustrate further embodiments of systems for interrogating an optical chip.

FIG. 6A illustrates an embodiment using a mirror 20 to project an second input spot on the detector array. In some embodiments, e.g. as shown, part of the light reflected by the beam splitter (13) is reflected and focused on the detector array 17. By slightly tilting the mirror this spot will appear above or below the input spot on the detector array, such that the two spots can be observed in the same image and subsequently compared to derive the deviation in optimal y-position. In some embodiments, this extra spot can also be advantageously used as power monitor to monitor the instantaneous laser power. In one embodiment, a (neutral density) filter may be added between beam splitter and mirror to make sure that both spots have roughly the same optical power.

In some embodiments (not shown), a prism or grating may be used to project the second input spot as a spectral line above or below the line with projected output spots. This spectral line can be used to monitor the instantaneous laser wavelength during a scan. For example, the wavelength can be determined by determining which one or more of the pixels in the spectral line receives which optical power, e.g. maximum amount.

In some embodiments, a narrow band wavelength filter may be applied in the path to the mirror 20. During a wavelength scan, the reflection from mirror 20 will appear or disappear, depending on the nature of the filter (pass- or stopband, respectively) so that the wavelength during a scan is not only relatively known (due to tracking of interferometer signals during the scan) but also in absolute sense. This facilitates signal processing, and enables signal integrity checking. Moreover, it allows monitoring of drift of an optional on-chip interferometer, which provides information on the actual chip temperature or mechanical stress. The filter may for example be incorporated as thin film filter, or as a (a-thermal) Fiber Bragg Grating (FBG). Such an FBG is a fiber-optic component, so that the mirror needs to be replaced by a lens system that couples the light into the FBG fiber, and the light from the FBG fiber back to the beam splitter 13.

In some embodiments, the mirror 20 is replaced by an interferometer, for example a Fabry-Perot interferometer, which is measured in reflection by the detector 17. The Free Spectral Range of this interferometer can be chosen to obtain a desired number of periods (e.g. five or more) in one wavelength scan. This enables monitoring of the relative wavelength of the laser during a scan at high resolution.

In some embodiments, multiple diagnostic elements such as interferometers and wavelength filters as mentioned above are included as a replacement or as an addition to mirror 20.

In some embodiments (not shown), the chip may be purposely positioned out of the focal point of the objective lens, to increase the size of the input spot on the chip. Alternatively, the lens 12 may be moved towards or away from the laser to defocus the laser spot at the location of the chip, or an additional lens may be inserted between lens 12 and beam splitter 13. This way it can be ensured that in any case the input structure of the chip, upon insertion of the chip in the instrument, is in the chip area that is illuminated by the input spot. By doing so, at least some light will always enter the chip and thus exit via the output structures. By monitoring the position on the detector array of the light exiting from the output structures, the location of the input structure can be calculated. Subsequently, the chip is positioned in the focal point of the objective and finally actuated until coinciding with the calculated position of the input structure. For example, to move the chip from the focal point, the chip itself, the objective lens, the collimator and/or the laser may be moved e.g. along the optical axis.

Due to the fact that the out-of-focus spot is much larger than the normal input spot, also less light is captured by the input structure and hence only a small amount of light will exit via the output structures. This may be too small to observe, using normal detector integration time. To ensure that sufficient signal is obtained, the detector integration time may be (temporarily) increased. Alternatively, the signal of multiple sequential images may be summed. In order to obtain the highest contrast between the summed output signals and any signal (e.g. as result of stray light) coming from other detector elements, a threshold may be set. In some embodiments, only signals collected during an integration period that are above the threshold are added. Conversely, if the signal collected by a detector element during one integration time is below the threshold the signal is not added to the result. Hence, as long as the stray light signal remains below the threshold, the added value for that particular detector element can remain zero.

Figure 6B:
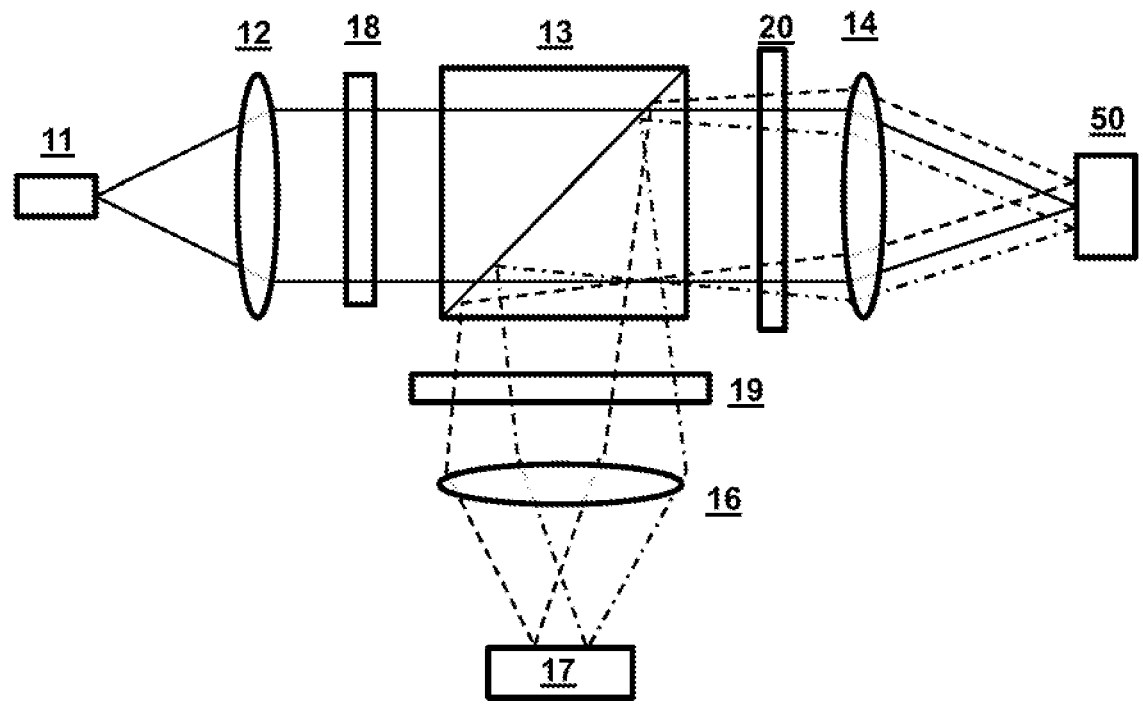

FIG. 6B illustrates other or further variations of the optical system. In one embodiment, a neutral density filter (18) is provided to reduce the light power incident on the detector array as to make sure the detector elements are not saturated during imaging. For example, a diode laser (e.g. VCSEL) is used due to the required tuning during a scan by means of varying the laser current (and therefore laser power). The system may be sensitive to stray light. For instance when a CMOS camera is used the quantum efficiency typically is largest in the visible range, while the signals of interest may be in another wavelength range, e.g. around 850 nm. In this or other cases a long pass filter 19 may be employed to remove stray light in the visible range while the 850 nm slight is transmitted. A polarizing beam splitter may be employed if one cannot afford to lose half the optical power each time the beam splitter is passed. For example, the beam splitter is tilted 45 degrees around the optical axis and a Faraday rotator is 20 inserted in the optical path. This brings the additional advantage that the light from the chip does not enter back into the laser, so that laser instabilities due to optical feedback are avoided. In some embodiments, a fully assembled optical isolator with the required waveplates is inserted as a whole at the location or next to the location of neutral density filter 18. In some embodiments, the observation of an input spot in the image can also be used as an indication that a chip is present in the instrument. Typically, it is preferred to direct part of the light received via the input structure directly to a dedicated output structure that can be used to verify that alignment has been achieved.

Figure 7A:
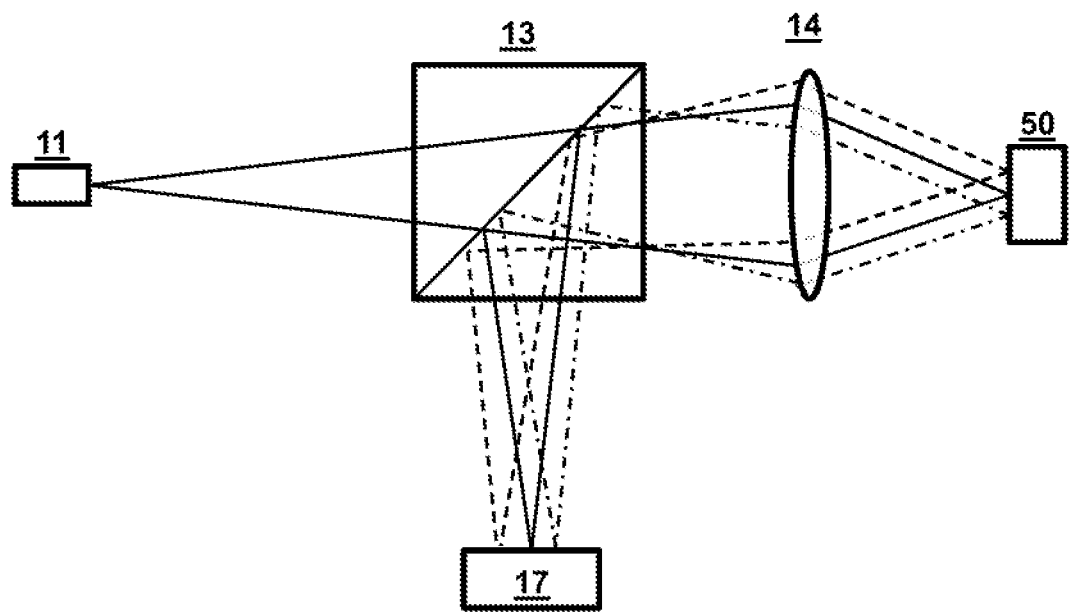

FIG. 7A illustrates a low cost alternative of the optical path shown e.g. in preceding figures. In some embodiments, e.g. as shown, the collimator or the second objective lens, or both can be omitted. For example, light from the laser 11 is focused by a single lens 14 onto the optical chip 50. Preferably, the same lens 14 is also used to image the light of the chip onto the detector 17.

Figure 7B:
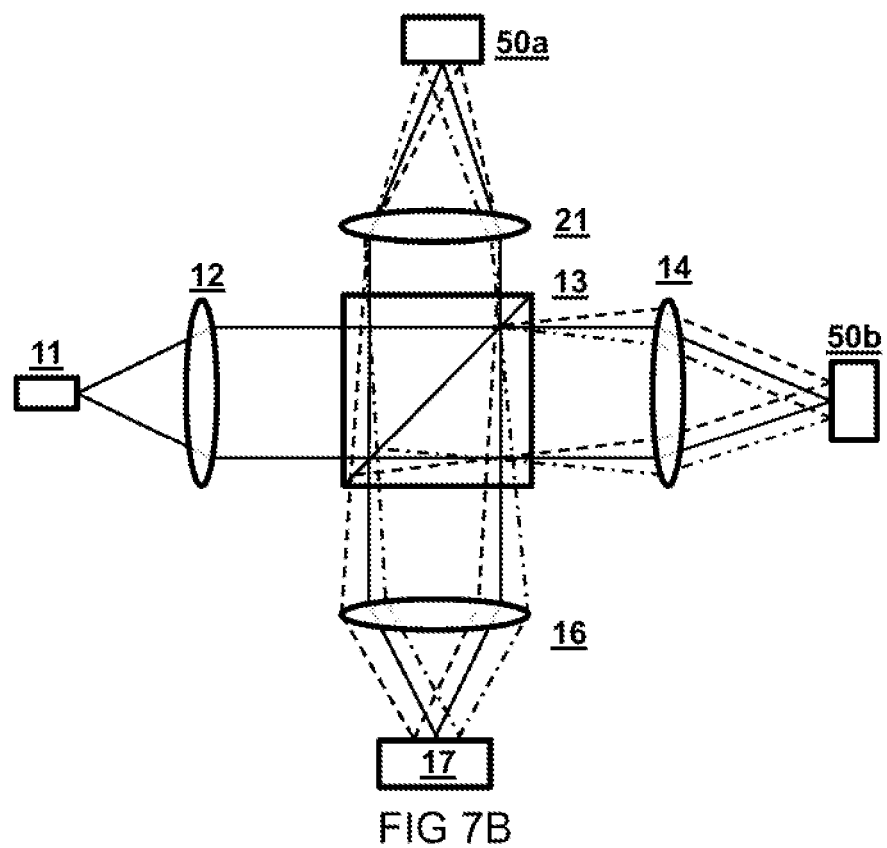

FIG. 7B illustrates an embodiment for simultaneous read out of two optical chips 50a,50b. For example, an objective lens and chip is added at the non-used beam splitter output, as shown. For example, the chips 50a,50b may have (output) ports at different location to allow simultaneous imaging on the detector, or one chip is inserted upside-down (relative to the projected image) where the ports are on one side off center with respect to the chip. Alternatively, or additionally, a wedged window may be used as beam splitter to offset the front and back reflections in slightly different angles and offsets on the detector. This may result in the spots of both chips e.g. being positioned on the detector array above each other. In some embodiments, the chips or the objective lenses 14, 21 are actuated in order to be able to independently align both chips with the laser.

Figure 8:
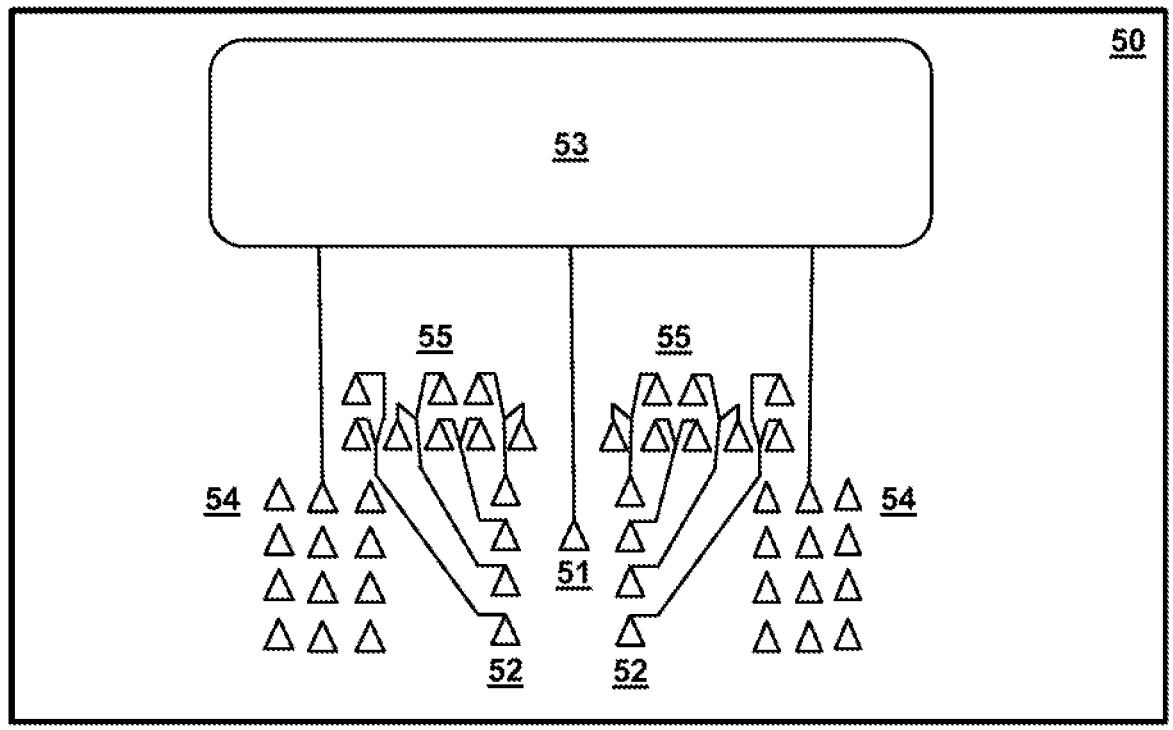
FIG. 8 illustrates on-chip alignment structures for a chip with vertical grating couplers.

FIG. 8 illustrates an embodiment with on-chip alignment structures 52 suitable for a chip that makes use of vertical grating couplers to couple light into and out of the chip. On either side of input port 51 are two gratings, which may have an increased width, that capture any input light over a large area and transport the light, via a tapered waveguide to an output ports 55, dedicated for alignment purposes. The design of the alignment structures is such that for any realistic misalignment of the chip upon insertion in the instrument, at least some light of the input spot is captured by one of the alignment structures, such that an output spot will appear in the image originating from one of the alignment output ports 55. The position of the output spot provides the information needed to reposition the input spot such that it coincides with the position of the input port 51, from which light is transported across the chip to the sensing area 53.

In some embodiments, e.g. as shown, each input 52 is routed to two outputs 55, providing two spots which are either in a horizontal, vertical, upwards diagonal or downwards diagonal orientation, which facilitates interpretation. It should be understood that any configuration that makes clear in which of the input ports 52 the light is input will provide the desired functionality. Also the use of the location of the input spot as observed on the detector may be considered for this purpose. Many output ports 54 can be imaged, all connected to e.g. individual sensors in the sensing area 53.

For the purpose of clarity and a concise description, features are described herein as part of the same or separate embodiments, however, it will be appreciated that the scope of the invention may include embodiments having combinations of all or some of the features described. For example, while embodiments were shown for specific optical setups and chips, also alternative ways may be envisaged by those skilled in the art having the benefit of the present disclosure for achieving a similar function and result. E.g. optical elements may be combined or split up into one or more alternative components. The various elements of the embodiments as discussed and shown offer certain advantages, such as easy alignment and efficiency for optical chip readout. Of course, it is to be appreciated that any one of the above embodiments or processes may be combined with one or more other embodiments or processes to provide even further improvements in finding and matching designs and advantages. It is appreciated that this disclosure offers particular advantages to free-space coupling of optical chips, and in general can be applied for any application wherein a light beam is aligned with an input/output structure. For example, the methods and systems described herein can be used to establish, improve, or maintain alignment of the input light on a sensor input port of an optical chip.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope.

The invention claimed is:

1. A method of interrogating an optical chip, the method comprising
illuminating the optical chip with input light;
using a detector to measure a spatially resolved image in which output light from the optical chip is imaged;
aligning a position of the input light on the optical chip based on a position of the output light and/or a reflection of the input light in the spatially resolved image; and
using the same detector to measure a spectral response of the optical chip based on an intensity of the output light in the spatially resolved image;
wherein the output light is emitted from a chip surface of the optical chip, and the input light is reflected from the chip surface, wherein the input and output light from the chip surface is projected by an imaging system onto a detector, wherein the imaging system is disposed in an optical path between the optical chip and the detector, wherein the optical chip is disposed in an object plane of the imaging system and the detector is disposed in an imaging plane of the imaging system.

2. The method according to claim 1, wherein the spatially resolved image comprises an image of the chip surface at one side of the optical chip, wherein the chip surface comprises one or more input ports for receiving the input light, and one or more output ports for emitting corresponding output light, wherein the input and output ports are disposed on the same side of the optical chip.

3. The method according to claim 1, wherein the spatially resolved image is projected onto a detector comprising a plurality of spatially distributed detector elements to simultaneously measure a spatial distribution of light intensities of the spatially resolved image including intensities of the input light and output light.

4. A method of interrogating an optical chip, the method comprising
illuminating the optical chip with input light;
using a detector to measure a spatially resolved image in which output light from the optical chip is imaged;
aligning a position of the input light on the optical chip based on a position of the output light and/or a reflection of the input light in the spatially resolved image; and
using the same detector to measure a spectral response of the optical chip based on an intensity of the output light in the spatially resolved image;
wherein a relative position of one or more input ports of the optical chip with respect to the input light illuminating the optical chip is determined based on position of the output light emitted from one or more output ports of the optical chip with respect to a reflection of the input light, and a relative position of the one or more input ports with respect to the one or more output ports on the optical chip.

5. A method of interrogating an optical chip, the method comprising
illuminating the optical chip with input light;
using a detector to measure a spatially resolved image in which output light from the optical chip is imaged;
aligning a position of the input light on the optical chip based on a position of the output light and/or a reflection of the input light in the spatially resolved image; and
using the same detector to measure a spectral response of the optical chip based on an intensity of the output light in the spatially resolved image;
wherein a position of the input light on the optical chip is aligned with respect a sensor input port of the optical chip based on a relative position of the output light in the image with respect to a relative position of the reflection of the input light in the image and/or with respect to a calibrated output position of the output light in a previous image.

6. A method of interrogating an optical chip, the method comprising
illuminating the optical chip with input light;
using a detector to measure a spatially resolved image in which output light from the optical chip is imaged;
aligning a position of the input light on the optical chip based on a position of the output light and/or a reflection of the input light in the spatially resolved image; and
using the same detector to measure a spectral response of the optical chip based on an intensity of the output light in the spatially resolved image;
wherein an at least initial overlap of the input light with one or more input ports of the optical chip is established by scanning a position of the input light over an alignment input area, wherein an extent of the scanned alignment input area is based on predetermined variation of the input port position between different chips.

7. A method of interrogating an optical chip, the method comprising
illuminating the optical chip with input light;
using a detector to measure a spatially resolved image in which output light from the optical chip is imaged;
aligning a position of the input light on the optical chip based on a position of the output light and/or a reflection of the input light in the spatially resolved image; and
using the same detector to measure a spectral response of the optical chip based on an intensity of the output light in the spatially resolved image;
wherein a position of a spot of the input light on a face of the optical chip is adjusted based on a shape of the reflection of the input light in the spatially resolved image.

8. A method of interrogating an optical chip, the method comprising
illuminating the optical chip with input light;
using a detector to measure a spatially resolved image in which output light from the optical chip is imaged;
aligning a position of the input light on the optical chip based on a position of the output light and/or a reflection of the input light in the spatially resolved image; and
using the same detector to measure a spectral response of the optical chip based on an intensity of the output light in the spatially resolved image;
wherein an at least initial overlap of the input light with one or more input ports of the optical chip is established by initially increasing a spot size of the input light, wherein the spot size is decreased after the at least initial overlap is established, wherein the spot size is increased or decreased by shifting a focal plane of the input light with respect to a surface of the optical chip.

9. A method of interrogating an optical chip, the method comprising
illuminating the optical chip with input light;
using a detector to measure a spatially resolved image in which output light from the optical chip is imaged;

aligning a position of the input light on the optical chip based on a position of the output light and/or a reflection of the input light in the spatially resolved image; and using the same detector to measure a spectral response of the optical chip based on an intensity of the output light in the spatially resolved image;

wherein an at least initial overlap of the input light with one or more input ports in a predetermined alignment area of the chip surface is determined by detecting a light intensity of one or more spots of output light in an observation area outside the predetermined alignment input area.

10. A method of interrogating an optical chip, the method comprising illuminating the optical chip with input light;

using a detector to measure a spatially resolved image in which output light from the optical chip is imaged;

aligning a position of the input light on the optical chip based on a position of the output light and/or a reflection of the input light in the spatially resolved image; and using the same detector to measure a spectral response of the optical chip based on an intensity of the output light in the spatially resolved image;

wherein a distance of the input light relative to a sensor input port at a first location of the optical chip is decreased by maximizing an intensity of measured output light at a distinct second location on the chip corresponding one or more sensor output ports.

11. A method of interrogating an optical chip, the method comprising illuminating the optical chip with input light;

using a detector to measure a spatially resolved image in which output light from the optical chip is imaged;

aligning a position of the input light on the optical chip based on a position of the output light and/or a reflection of the input light in the spatially resolved image; and using the same detector to measure a spectral response of the optical chip based on an intensity of the output light in the spatially resolved image;

wherein the optical chip comprises at least one sensor input port and a corresponding set of one or more sensor output ports connected to the sensor input port via a respective set of waveguides, wherein light traveling along a respective waveguide between the sensor input port and a respective sensor output port interacts with one or more optical sensor elements there between, wherein a spectrum of the output light with respect to the input light is determined by a sensor measurement of the one or more optical sensor elements.

12. A method of interrogating an optical chip, the method comprising illuminating the optical chip with input light;

using a detector to measure a spatially resolved image in which output light from the optical chip is imaged;

aligning a position of the input light on the optical chip based on a position of the output light and/or a reflection of the input light in the spatially resolved image; and using the same detector to measure a spectral response of the optical chip based on an intensity of the output light in the spatially resolved image;

wherein the optical chip comprises one or more alignment input ports and corresponding alignment output ports connected via respective waveguides without optical sensor element there between, wherein the one or more alignment input ports comprise a tapered input structure to increase an extend of the alignment input ports accepting the input light.

13. A system for interrogating an optical chip, the system comprising a chip holder configured to hold a surface of the optical chip in an object plane;

a light source configured to generate input light and illuminate at least one input port of the optical chip with a light spot of the input light;

a detector with a plurality of detection elements disposed at an imaging plane and configured to measure one or more light intensities of output light from one or more output ports of the optical chip;

an imaging system configured to project a spatially resolved image of output light from the object plane where the surface of the optical chip is held, onto the imaging plane, where the detection elements of the detector are disposed; and a controller;

wherein the system is configured to project a focused light spot of the input light onto the object plane of the imaging system where the input port is disposed at the same surface of the optical chip as the one or more output ports; and the system is configured to align a position of the input light on the optical chip based on a position of the output light and/or the reflection in the spatially resolved image measured by the detector, and to use the same detector for measuring a spectral response of the optical chip based on the output light in the spatially resolved image, wherein the controller is configured to align a position of the input light spot with respect to an input port of the optical chip based on a position and/or shape of the measured reflection of the light spot of input light in the image relative to a position and/or intensity of one or more distinct spots of the output light at a distance from the input light spot.

14. The system according to claim 13, wherein the controller is further configured to establish an at least initial overlap of the input light with one or more input ports of the optical chip by scanning a position of the input light over an alignment input area, wherein an extent of the scanned alignment input area is based on predetermined variation of the input port position between different chips.

15. The system according to claim 13, wherein the controller is further configured to establish an at least initial overlap of the input light with one or more input ports of the optical chip by initially increasing a spot size of the input light, wherein the spot size is decreased after the at least initial overlap is established, wherein the spot size is increased or decreased by shifting a focal plane of the input light with respect to a surface of the optical chip.

16. The system according to claim 13, wherein the controller is further configured to determine a shape of the reflection of the input light in the spatially resolved image, and adjust a position of the spot of the input light on a face of the optical chip based, at least in part, on the determined shape.

17. A system for interrogating an optical chip, the system comprising a chip holder configured to hold a surface of the optical chip in an object plane;

a light source configured to generate input light and illuminate at least one input port of the optical chip with a light spot of the input light;

a detector with a plurality of detection elements disposed at an imaging plane and configured to measure one or more light intensities of output light from one or more output ports of the optical chip;

an imaging system configured to project a spatially resolved image of output light from the object plane where the surface of the optical chip is held, onto the imaging plane, where the detection elements of the detector are disposed; and a controller;

wherein the system is configured to project a focused light spot of the input light onto the object plane of the imaging system where the input port is disposed at the same surface of the optical chip as the one or more output ports; and the system is configured to align a position of the input light on the optical chip based on a position of the output light and/or the reflection in the spatially resolved image measured by the detector, and to use the same detector for measuring a spectral response of the optical chip based on the output light in the spatially resolved image, wherein the controller is configured to align a position of the input light spot with respect to an input port of the optical chip based on a measured position of one or more distinct spots of the output light in the image, relative to a calibrated position of corresponding one or more distinct spots of the output light in a previous image.

18. A system for interrogating an optical chip, the system comprising a chip holder configured to hold a surface of the optical chip in an object plane;

a light source configured to generate input light and illuminate at least one input port of the optical chip with a light spot of the input light;

a detector with a plurality of detection elements disposed at an imaging plane and configured to measure one or more light intensities of output light from one or more output ports of the optical chip; and an imaging system configured to project a spatially resolved image of output light from the object plane where the surface of the optical chip is held, onto the imaging plane, where the detection elements of the detector are disposed;

wherein the system is configured to project a focused light spot of the input light onto the object plane of the imaging system where the input port is disposed at the same surface of the optical chip as the one or more output ports; and the system is configured to align a position of the input light on the optical chip based on a position of the output light and/or the reflection in the spatially resolved image measured by the detector, and to use the same detector for measuring a spectral response of the optical chip based on the output light in the spatially resolved image, wherein the imaging system is configured to project the input light, reflected from the surface of the optical chip, and the output light, emitted from the surface of the optical chip, together onto the detector.

* * * * *